US006861944B1

(12) United States Patent
Hoepelman

(10) Patent No.: US 6,861,944 B1
(45) Date of Patent: Mar. 1, 2005

(54) AUTHORIZATION CONTROL SYSTEM

(75) Inventor: Jakob Hoepelman, Malmsheim (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/393,274

(22) Filed: Sep. 10, 1999

(30) Foreign Application Priority Data

Sep. 30, 1998 (EP) ........................................... 98118479

(51) Int. Cl.[7] .............................. H04Q 9/00; F41A 9/53

(52) U.S. Cl. .......................... 340/5.1; 340/5.2; 340/5.6; 340/539.1; 89/28.05; 89/135; 42/1.01; 235/380; 235/382; 341/33

(58) Field of Search ......................... 340/5.1, 5.2, 5.21, 340/5.22, 5.23, 5.24, 5.25, 5.51, 5.52, 5.53, 5.54, 5.6, 539.1, 5.61; 89/132, 135, 136, 138, 27.3, 28.05; 235/380, 382; 42/1.01, 70.06, 70.01, 84, 70.07; 341/20, 33, 34

(56) References Cited

U.S. PATENT DOCUMENTS

| | | | | |
|---|---|---|---|---|
| 4,189,712 A | * 2/1980 | Lemelson | .................. | 340/5.62 |
| 5,204,672 A | 4/1993 | Brooks | .................. | 340/825.31 |
| 5,502,915 A | 4/1996 | Mendelsohn et al. | ...... | 42/70.11 |
| 5,603,179 A | * 2/1997 | Adams | ...................... | 42/70.08 |
| 5,682,032 A | 10/1997 | Philipp | ....................... | 235/422 |
| 5,812,252 A | * 9/1998 | Bowker et al. | ........ | 340/825.31 |
| 5,828,301 A | * 10/1998 | Sanchez | ..................... | 340/539 |
| 5,973,318 A | * 10/1999 | Plesko | ................... | 250/227.22 |
| 6,754,472 B1 | 6/2004 | Williams et al. | ............ | 455/100 |

FOREIGN PATENT DOCUMENTS

| | | |
|---|---|---|
| DE | 44 35 894 A | 4/1996 |
| FR | 2 688 301 A | 9/1993 |
| GB | 2 129 176 A | 5/1984 |
| GB | 2 306 725 A | 5/1997 |

OTHER PUBLICATIONS

European Search Report dated Feb. 14, 2001.

* cited by examiner

*Primary Examiner*—Donnie L. Crosland
(74) *Attorney, Agent, or Firm*—Louis J. Percello, Esq.; McGinn & Gibb, PLLC

(57) ABSTRACT

An authorization control system controlling who may use a device, includes a device for storing personal code data, a signal provider for outputting signals representing the personal code data, a signal delivery interface for receiving signals representing the personal code data, and adapted for wear by a user in proximity to a body of the user, a signal receive interface means, connected to the device, for receiving the signal from the signal delivery interface, a signal processing device, connected to the signal receive delivery interface, for determining a user's authorization for using the device by evaluating the signals and outputting a signal indicative of an evaluation result, a control device connected to the signal processing device, and an actuator for the device coupled to the control device, for allowing the user to use the device based on an output of the control device. Thus, the system allows a person to use the device only after the person has completed a successful authorization check. The authorization check is performed with confidential personal data, carried by the person including data stored in digital form in the device. The personal data is transferred automatically from the person into a device's data processing area of the device when an authorized person uses the device.

18 Claims, 4 Drawing Sheets

AUTHORIZATION CONTROL SYSTEM

BACKGROUND OF THE INVENTION

1. Field of the Invention

The present invention relates to authorization control systems, and in particular to authorization control systems for preventing unauthorized use of devices. Specifically, the invention relates to authorization control systems for preventing unauthorized use of devices such as firearms, cars or other valuable or dangerous devices.

2. Description of the Related Art

Control systems, such as those for controlling the use of firearms, especially in the United States of America where many people possess a firearm for defending themselves against attack are important. With a rise in crime and concern for personal safety, the need for effective protection in the form of a personal firearm is increasing. As the number of firearms sold increases so does the risk increase that unauthorized persons (e.g., criminals) can steal a firearm even though they may not be allowed to have it by law. Young children, students, etc. are other examples of persons who typically are unauthorized to use firearms.

A solution to the problem of unauthorized use is to lock the firearms in a secure place. This solution, however, is not satisfactory because such a place can be found and accessed by unauthorized individuals.

Another problem with firearms may arise in a scuffle between, for example, a policeman and a suspect (e.g., an arrested person), when the arrested person may succeed in taking possession of the policeman's firearm. In such a situation, the person could shoot the policeman.

Hitherto the present invention, there has been no system that provides an efficient authorization control mechanism for preventing unauthorized use of devices, especially firearms, cars, etc.

SUMMARY OF THE INVENTION

In view of the foregoing and other problems, disadvantages, and drawbacks of the conventional methods and structures, an object of the present invention is to provide a method and structure in which a predetermined object (e.g., a firearm, vehicle, or other object) can be secured with an authorization system.

Another object of the present invention is to provide an efficient authorization control system for preventing unauthorized use of devices, particularly devices like firearms and cars.

It is another object of the invention to provide authorization control systems which are simple to use and install and yet secure.

It is a further object of the invention to provide authorization control systems which can be produced with a minimum of production costs.

In a first aspect of the invention, a system is provided which includes storage for storing personal code data, a signal provider for outputting signals representing the personal code data, a signal delivery interface for receiving signals representing the code data (preferably the signal being in a form wearable by a human in proximity to the body), a signal receive interface connected to a device wherein a signal is received via the signal delivery interface, a signal processing device for outputting a signal connected to the signal receive interface, a control device connected to the signal processing device, and an actuator device for carrying out an operation.

The person who is authorized to use a firearm wears near his person a small transmitter embedded with a microchip in which secret, personal code data specific to this person or in case of a policeman, to a group of policemen or eventually relating to any policeman, is stored.

The same personal code data is stored in the firearm. When a person wants to fire the weapon, the personal code data is automatically transferred from the person to the firearm and a comparison of the codes is performed to determine if they are identical. The transfer is achieved via a pair of electrical coupling devices which can be an ordinary metal contact, or, advantageously via a pair of electrodes. One electrode couples the stored data from the person's data carrier into his own body, and the second electrode receives a signal, representing the personal code data from the person's body and transmits them to an evaluation circuit present in the firearm.

In this circuit, the authorization data are compared. When they are identical, a special purpose lock/unlock mechanism (e.g., engaging the trigger or another portion of the mechanical effectuation chain, beginning with the trigger and ending with the firing pin) within the firearm is enabled. As a result, the authorized person can fire the firearm as normal. However, when the receiver in the firearm does not receive any data or it receives data which does not match that stored in the firearm, the lock/unlock mechanism is not enabled, so the trigger of the firearm remains locked and will not fire.

The default position of the lock/unlock-mechanism can be an unlocked position (e.g., the trigger), which will lock when the data compare operation is negative (i.e., the person who wants to shoot the firearm is not authorized to do so).

The present disclosure relates to European Patent Application No. 98118479.9 filed Sep. 30, 1998, and which is expressly incorporated herein by reference in its entirety.

BRIEF DESCRIPTION OF THE DRAWINGS

The foregoing and other purposes, aspects and advantages will be better understood from the following detailed description of preferred embodiments of the invention with reference to the drawings, in which.

DETAILED DESCRIPTION OF PREFERRED EMBODIMENTS OF THE INVENTION

Figure 1:
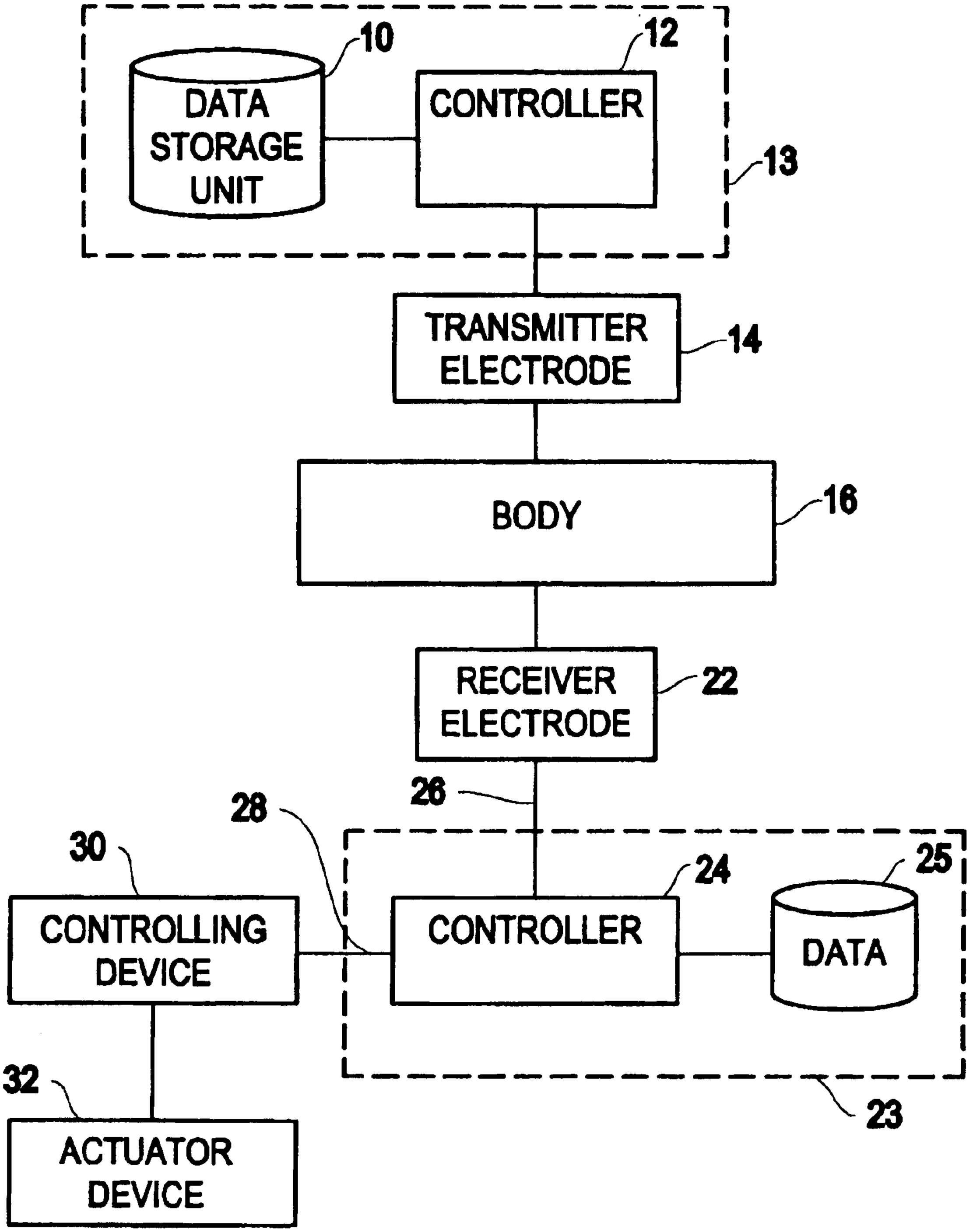
FIG. 1 depicts a schematic block diagram of the system in accordance with a preferred embodiment of the invention.

With reference to the figures and particularly to FIG. 1, an embodiment of the inventive system includes a data storage unit 10, the data of which can be accessed by a controller 12. Data storage unit 10 and controller 12 form a transmitter-side chip.

The data storage preferably is a programmable read-only non-volatile memory (PROM) which stores the personal code data of an authorized person in the form of a bit sequence of a predetermined length (e.g., 256 bits).

The controller 12 includes a transmitter which couples signals, representing the personal code data, through a transmitter electrode 14 into the body 16, of the authorized person. The transmitter preferably is an LC-tank circuit (e.g., with a current ratio Q (current in the tank circuit over current in the feed line of the tank circuit) of Q=6), made from a surface-mount inductor and the inherent electrode capacitance.

All electrical and electronic devices are supplied with a DC voltage source. The resonant tank circuit produces a clean sine wave output from a square wave input, minimizing RF harmonics, and boosts the output voltage in proportion to the Q of the tank.

The transmit voltage can also be digitally programmed by varying the pulse width of the driving square wave. The transmitter electrode 14 couples the modulated voltage capacitively into the authorized person's body. This PAN (Personal Area Network) technology was described in greater detail, in relation to a data exchange between persons, in "IBM Systems Journal, Vol. 35, No 3&4, 1996," the contents of which is expressly incorporated by reference into the present patent application.

This technology, called "near-field communication", can operate at very low frequencies (e.g., about 0.1 to about 1 megahertz). This frequency is directly generated from inexpensive microcontroller devices which are easily worn (e.g., as a wrist-watch-like form).

Thus, an electrical current which is small in intensity and not damaging to the health of the person wearing the microcontroller, is fed into the authorized person's body 16 which acts as a "wet wire".

When the person wants to fire the firearm, the operation shown in the lower part of FIG. 1 will be enabled by capacitive coupling, as described below.

The person grasps the grip 18 (e.g., FIG. 2) of the firearm 20 when they wish to use the firearm 20. The firearm 20 is adapted to both right-handed and left-handed persons. In both grip plates, one of which could be contacted by a larger area of the inner side of the person's hand, a receiving electrode 22 is embedded. The impedance of the receiving electrode has a level such that the current fed into the body 16 can be received by an antenna-like device (not illustrated).

The signal, received by the receiver electrode 22 incorporated in the firearm 20, is amplified by an amplifier including a controller 24 arranged (e.g., as a chip 23—see the broken lines in FIG. 1) inside of the firearm.

The controller 24 is connected to the receiver electrode 22 by a wire connection 26. In the controller, the signal is demodulated, A-D-converted, and the data output is compared to the data stored in data storage area 25, incorporated in the controller (receiver side) chip 23. The controller 24 produces an output signal 28 (e.g., "0"="identical", or "1"="not identical" or vice versa depending on the designer's requirements) to a controlling device 30 which controls an actuator device 32 for blocking or permitting movement of the firearm's trigger based on the output signal of the controller.

Conventional techniques can be considered in how the controlling device 30 controls the actuator device 32 which blocks or permits movement of the trigger.

The receiving, evaluating and actuating circuit shown in the lower portion of FIG. 1 may be powered by a power source such as storage batteries or the like (not depicted).

Persons could wear the devices referred to in the upper portion of FIG. 1 in a watch-like form on their wrist. The body contact area at the wrist is large enough to communicate the data into the body.

Alternatively, PAN devices can take the shape of other commonly worn objects including watches, credit cards, eyeglasses, identification badges, belts, waist packs, shoe inserts, etc. The capacitive coupling area must be large enough to be able to communicate the signals into the body.

Advantageously, near-field communication does not require a large amount of energy as it works at very low frequencies in contrast to far-field communication techniques (e.g., GSA mobile radio communication). For example the transmitter, depicted in FIGS. 1 and 2 can operate at 330 kilohertz at 30 volts with a 10-picofarad electrode capacitance, consuming 1.5 milliwatts discharging the electrode capacitance. Optionally, through energy-recycling, a majority of this power is conserved by using a resonant inductance-capacitance (LC) tank circuit.

Figure 2:
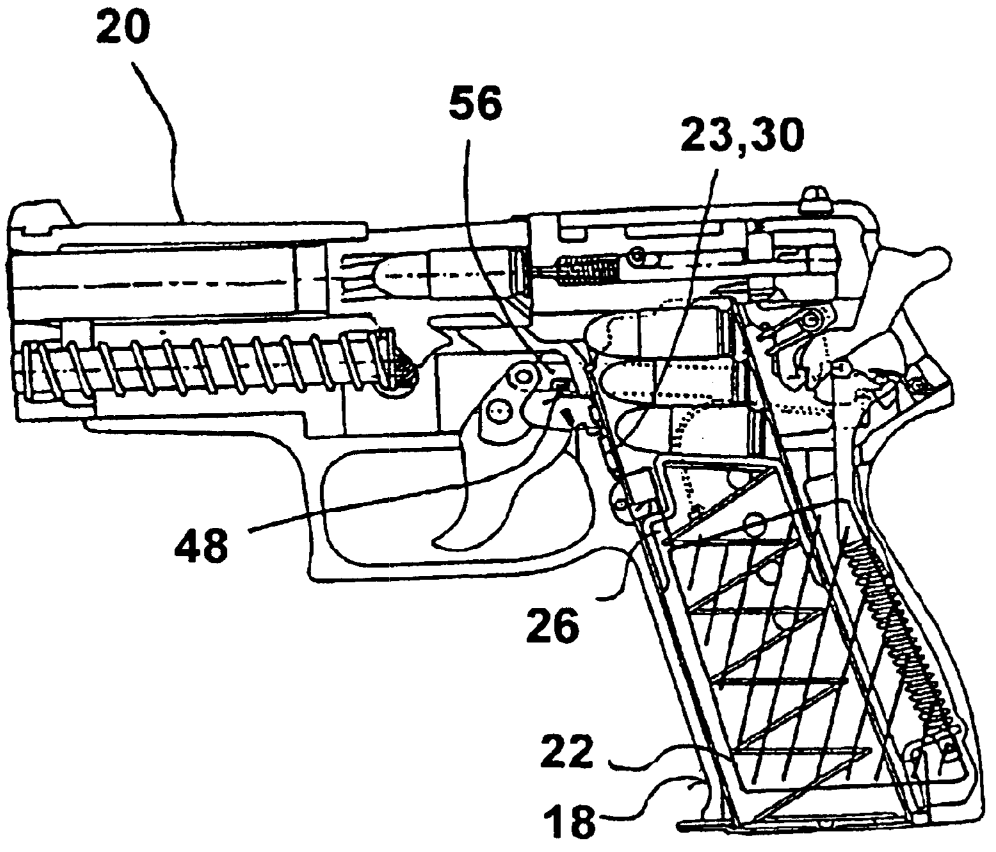
FIG. 2 shows a schematic view of a firearm, (e.g., a SIG-Sauer pistol P 225 (P6)), provided with an exemplary embodiment of the control system of the invention, a trigger lock/unlock mechanism engaged before authorization control.
Figure 3:
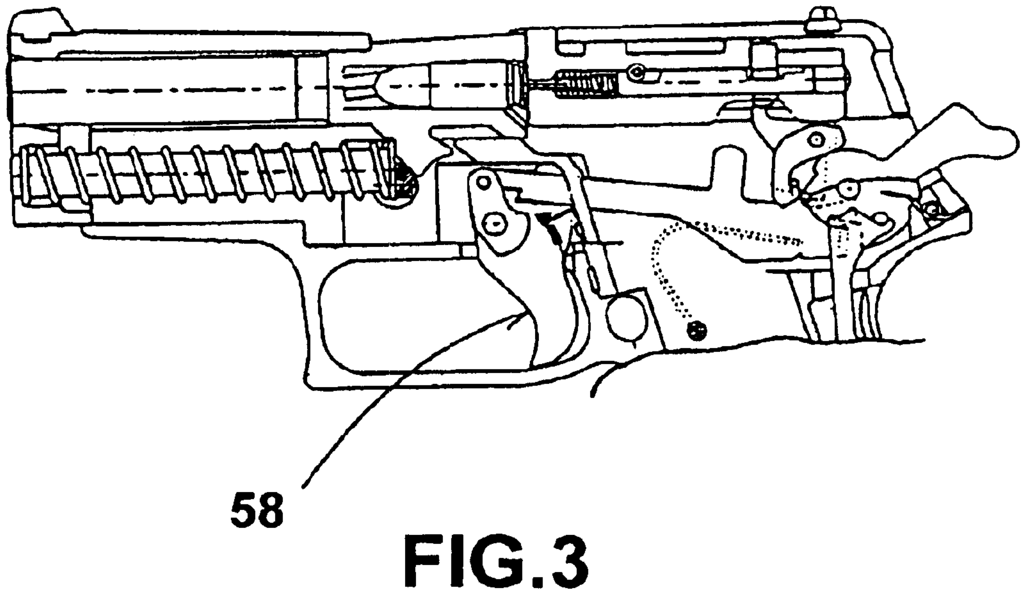
FIG. 3 shows a schematic view of the firearm shown in FIG. 2, the trigger lock/unlock mechanism disengaged after successful authorization control.

With reference to FIGS. 2 and 3, a schematic representation of a firearm (e.g., a SIG-Sauer pistol P 225 (P6), which some German police units are equipped with) is shown. The depicted pistol is shown with an exemplary embodiment of the control system of the invention.

The SIG-Sauer pistol P 225 (P6) is an automatic pistol equipped with a double action trigger. Thus, motion of the trigger is biasing the hammer and unlocks the firing pin.

The receiver electrode 22 is embedded in each of the grip plates of grip 18. A shielded wire line 26 connects the receiver electrode with the receiving side controller chip 23 which includes a circuit 24 including a current amplifier (e.g., gain=106) followed by an analog bipolar chopper controlled by a digital microcontroller. The detector synchronously integrates the received displacement current, (e.g. 50 picoamperes, 330 KHz), into a voltage that can be measured by a low-resolution analog-to-digital converter (e.g., operating at e.g. 50 KHz, 8 bits). The analog components and the microcontroller are combined into a single CMOS integrated circuit in chip form, to produce a low-cost integrated PAN receiver.

Further, circuit 24 includes a logic circuit with a storage area 25 storing an identical code to that stored in the authorized person's data carrier. The logic circuit evaluates the digital data extracted from the received signal and compares it to the data stored in the firearm. If the data compare results in "identical", the lock mechanism is unlocked (e.g., see FIG. 3). Otherwise, it remains blocked.

The lock mechanism (e.g., shown in further detail in FIG. 4) includes a locking member 48 having a rod 50 fixedly mounted with a small end portion 51 perpendicular to the length extension of the rods at a base portion 53 fixedly connected to an inner frame portion of the grip. The opposite end portion of the rod 50 is a protruding member 52 which engages an opening 54 formed in the trigger bar 56. When member 52 engages the opening 54, movement of the trigger is prevented, and the weapon does not fire. The rod is biased to securely engage the opening 54.

Figure 4:
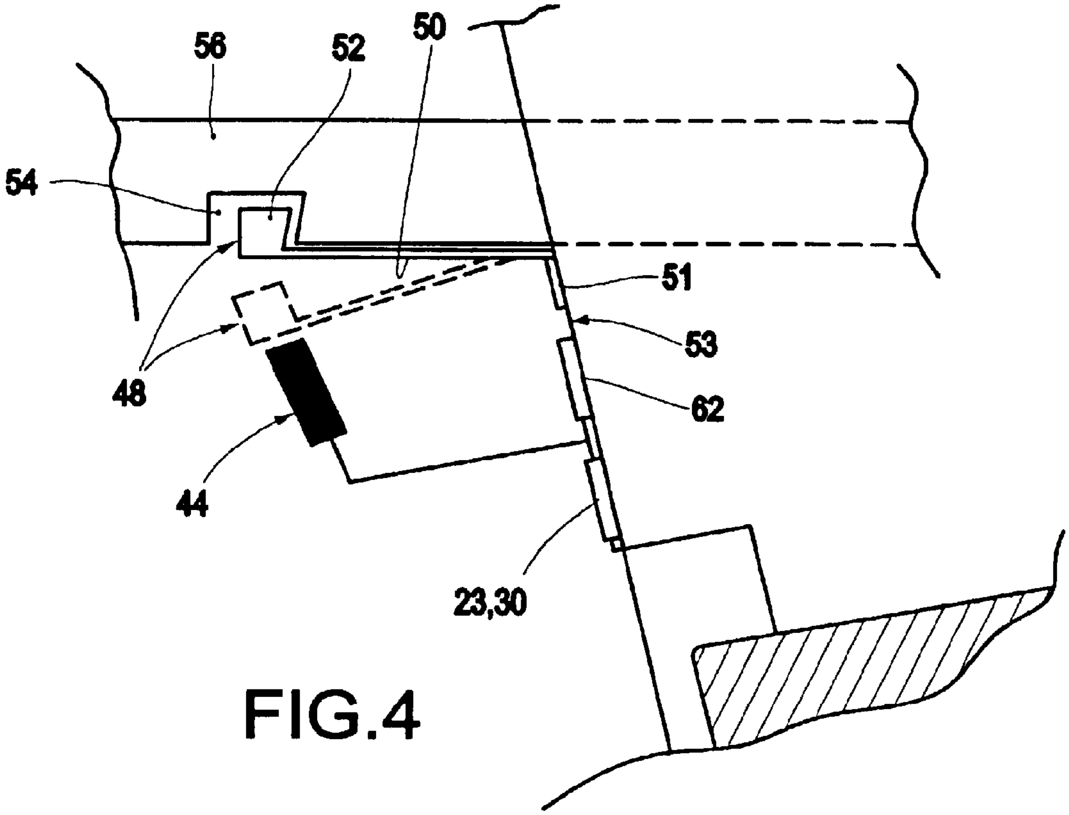
FIG. 4 shows a schematic detailed view of the pistol shown in FIG. 2 and FIG. 3 in which the operation of an exemplary lock/unlock mechanism working with the system of the present invention is shown.

With member 52 disengaged from opening 54 (e.g., see FIG. 4 showing the position of the locking member in broken lines), movement of the trigger for firing the weapon is possible.

For unlocking the lock mechanism, in the event of a "successful" data comparison operation, a simple relay-like circuit, provided with a fixedly mounted coil 44, is energized and attracts (e.g., by magnetic force) the back side of the end portion of metal locking member 48. Thus, the metal locking member 48 is attracted against the elastic force of the metal rod 50, and disengages the opening 54 in the trigger bar 56. As a result, the rod is bent backward and is moved to the attracting coil 44 until the backside 48 touches the coil 44.

Now, trigger 58 can be squeezed as usual and the person holding the firearm can fire (e.g., see FIG. 3) the same.

Chip 23 includes a timer which activates the authorization control procedure after a certain time period (e.g., milliseconds), thereby permitting a plurality of shots to be fired in a relatively short time sequence without being affected by the control system. Thus, the coil 44 remains energized during this preselected delay time.

After firing, the trigger bar 53 returns to the position shown in FIG. 2. When the coil is no longer energized, the firearm is again locked, and a new authorization control must be performed before firing again.

The angle of the edges on metal locking member 48 and opening 54 are such that the engaging edges cannot slide away without the magnetic attraction provided by coil 44. Therefore, the weapon cannot be fired by unauthorized personnel.

Further, the lock/unlock mechanism is enclosed in a case to prevent tampering with the mechanism.

Figure 5A:
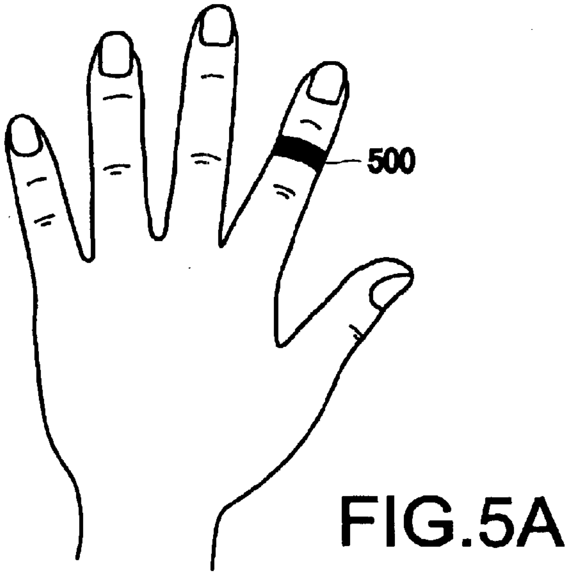
FIG. 5A illustrates a finger ring incorporating the present invention.

In a further embodiment, as shown in FIG. 5A, the transfer of data is achieved by a direct electrical contact between one contact surface embedded in and protruding slightly from the finger facing portion of the trigger and a second contact being provided by a ring-like device 500, worn by the authorized person. The ring serves as a carrier for holding the chip with the personal data. As such, the ring device 500 may include the above-described storage device, signal provider, and signal delivery interface.

Further variations may include a lock/unlock mechanism placed elsewhere. For example, the motion of the hammer hitting the firing pin can be prevented by blocking the main spring guide rod. Alternatively, the lock/unlock mechanism can be combined with an existing safety system (e.g. firing pin variation). It should be noted that the arrangement, the location, and the structure of the lock/unlock mechanism will reflect the influence of magnetic fields produced by an unauthorized person and the construction and application of each firearm which is an object of the invention.

In a further preferred embodiment of the invention, the device to be controlled is provided with a mechanism for storing a time period in which it can be used. This time period recording and storing device can advantageously be incorporated into receiver side chip 23 (e.g., signal processing device). Thus, a pair of data elements (e.g., shooting time and personal code data) can be stored. This is a beneficial feature when the firearm is for use by a limited group of persons. Later investigations, regarding questions like which person fired, at which time, and how often are easier to evaluate.

Figure 5B:
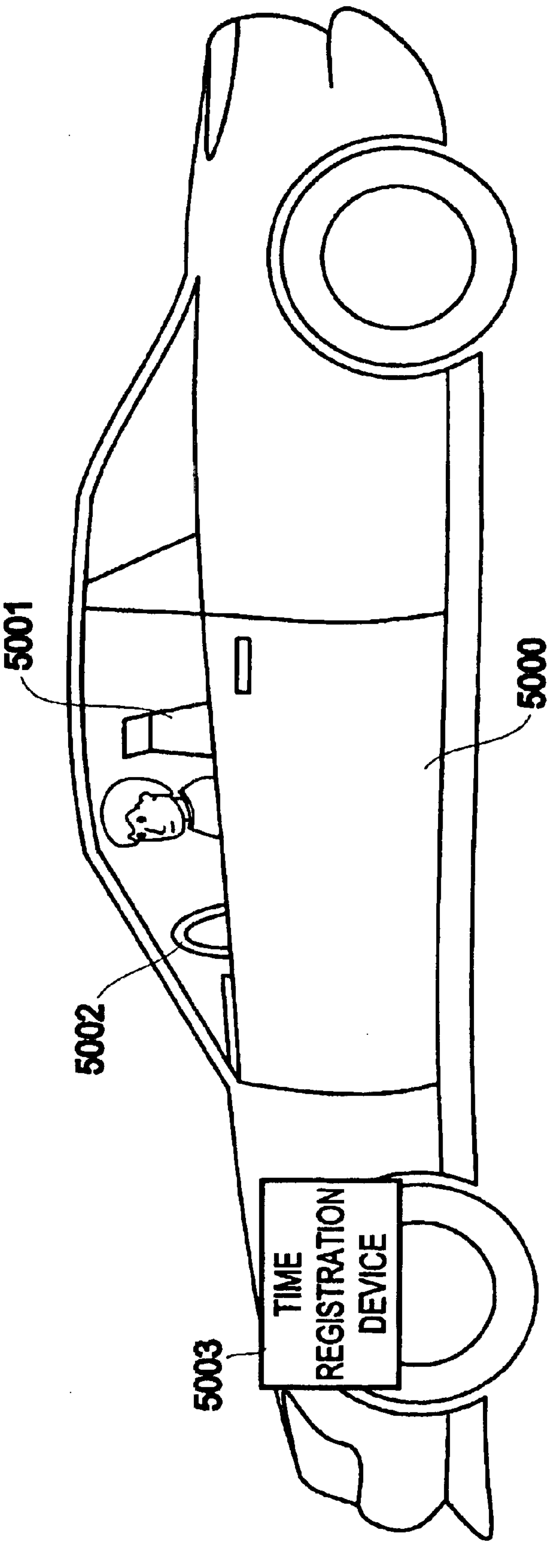
FIG. 5B illustrates a vehicle for incorporating the present invention.

A further application of the invention is to prevent car theft, or excessive driving by, for example, truck drivers or other professional drivers, as shown in FIG. 5B. The signal receive interface means can be advantageously incorporated into a car 5000, and specifically into a driver's seat 5001 or a steering wheel 5002 to provide a sufficiently large capacitive coupling area. Using a time registration device 5003 which can be integrated into a signal processing device similar to that described above, it is possible to control, for example, the exact time period during which a truck driver is driving on the road. Thus, exceeding the driving time limit set by law can be monitored easily and enforced.

While the invention has been described in terms of several preferred embodiments, those skilled in the art will recognize that the invention can be practiced with modification within the spirit and scope of the appended claims.

Having thus described my invention, what I claim as new and desire to secure by Letters Patent is as follows:

1. An authorization control system for personal use of a device, comprising:

storage means for storing personal code data;

signal provider means for outputting signals representing said personal code data;

signal delivery interface means for receiving said signals representing said personal code data, and adapted for wear by a user in proximity to a body of the user;

signal receive interface means, connected to the device, for receiving said signal from said signal delivery interface means;

a signal processing device, connected to said signal receive interface means, for determining a user's authorization for using the device by evaluating said signals and outputting a signal indicative of an evaluation result;

a control device connected to said signal processing device; and an actuator for said device coupled to said control device, for allowing said user to use said device based on an output of said control device, wherein a signal path between said signal provider means and said signal receive interface means includes a user's body, and wherein said signal delivery interface means is capacitively coupled to said signal receive interface means.

2. The authorization control system as claimed in claim 1, wherein said signal processing device comprises a time registration and storing device, said time registration including a range of time in which said user is authorized to operate said device.

3. The authorization control system as claimed in claim 1, wherein said device comprises a firearm.

4. The authorization control system as claimed in claim 3, wherein said signal delivery interface means comprises a transmitter device including a transmitter electrode capacitively coupling a displacement current modulated by the signals representing said code data into the user's body, and wherein said signal receive interface means comprises a receiver device including a receiver electrode capacitively receiving said signals from a user's hand.

5. The authorization control system as claimed in claim 1, wherein said device comprises a firearm including a trigger, wherein said signal delivery interface means comprises an electrically conducting portion of a finger ring worn by said user, wherein said signal receive interface means comprises an electrically conducting portion of the trigger of the firearm, and wherein an electrical circuit is closed when the user touches the trigger of the firearm with the conducting portion of said finger ring and personal code data signals are transmitted.

6. The authorization control system as claimed in claim 1, wherein the device comprises one of a car and a firearm.

7. The authorization control system for personal use of a device, according to claim 1, wherein said device is usable when a comparison of two carriers of electronically stored identification information affirms an identical match.

8. A firearm comprising:

a signal processing device;

signal receive interface means, connected between a signal source external to said firearm and said signal processing device included in said firearm, wherein said signal processing device is connected to said signal receive interface means for delivering an output signal;

a controlling device connected to said signal processing device; and an actuator for said firearm, connected to said controlling device, for selectively inhibiting the firing of the firearm based upon an output signal from said controlling device, wherein a signal path between said signal receive interface means and said signal processing device includes a user's body, and wherein said signal receive interface means is capacitively coupled to said signal processing device.

9. The firearm as claimed in claim 8, wherein said signal receive interface means comprises a capacitively coupling receiving device embedded in a grip of the firearm, and wherein said firearm comprises an integrated circuit implementing said signal processing device and said controlling device.

10. The firearm as claimed in claim 8, further comprising a trigger coupled to said actuator wherein said signal receive interface means comprises an electrically conducting portion of the trigger.

11. The firearm as claimed in claim 8, wherein said signal receive interface means receives signals when said firearm is being used by a user, the signals relating to personal code data associated with a person or group of persons authorized to use said firearm.

12. A finger ring for a device authorization control system, comprising:

a storage device for storing data, wherein said data comprises personal code data;

a signal provider outputting signals representing said personal code data;

a signal delivery interface for receiving signals representing said personal code data;

signal receive interface means, connected to the device, for receiving a signal from said signal delivery interface means, wherein a signal path between said signal provider and said signal delivery interface includes a user's body, wherein said signal delivery interface means is capacitively coupled to said signal receive interface means.

13. The finger ring as claimed in claim 12, further comprising:

an integrated circuit connected to said storage device and said signal provider; and an electrically conducting portion forming said signal delivery interface.

14. An authorization control system for personal use of a device, comprising:

a storage device for storing personal code data;

a signal provider for outputting signals representing said personal code data;

a signal delivery interface for receiving signals representing said personal code data, and adapted for wear by a user in proximity to a body of the user;

a signal receive interface, connected to the device, for receiving said signal from said signal delivery interface;

a signal processing device, connected to said signal receive interface, for determining a user's authorization for using the device by evaluating said signals and outputting a signal indicative of an evaluation result;

a control device connected to said signal processing device; and an actuator for said device coupled to said control device, for allowing said user to use said device based on an output of said control device, wherein a signal path between said signal provider and said signal delivery interface includes a user's body, and wherein said signal delivery interface is capacitively coupled to said signal receive interface.

15. The authorization control system as claimed in claim 14, wherein said device comprises a firearm.

16. The authorization control system as claimed in claim 15, wherein said signal delivery interface comprises a transmitter device including a transmitter electrode capacitively coupling a displacement current modulated by the signals representing said code data into the user's body, and wherein said signal receive interface comprises a receiver device including a receiver electrode capacitively receiving said signals from a user's hand.

17. The authorization control system as claimed in claim 14, wherein said device comprises a firearm including a trigger, wherein said signal delivery interface comprises an electrically conducting portion of a finger ring worn by said user, wherein said signal receive interface comprises an electrically conducting portion of the trigger of the firearm, and wherein an electrical circuit is closed when the user touches the trigger of the firearm with the conducting portion of said finger ring and personal code data signals are transmitted.

18. A firearm comprising:

a signal processing device;

a signal receive interface, connected between a signal source external to said firearm and said signal processing device included in said firearm, wherein said signal processing device is connected to said signal receive interface for delivering an output signal;

a controlling device connected to said signal processing device; and an actuator for said firearm, connected to said controlling device, for selectively inhibiting the firing of the firearm based upon an output signal from said controlling device, wherein a signal path between said signal source and said signal processing device includes a user's body, and wherein said signal receive interface means is capacitively coupled to said signal processing device.

* * * * *